July 23, 1957 R. A. KROPP 2,800,065
SOIL CONDITIONER
Original Filed April 13, 1944 4 Sheets-Sheet 1

Inventor
Roy A. Kropp
By Hill, Sherman, Meroni, Gross & Simpson
Attys

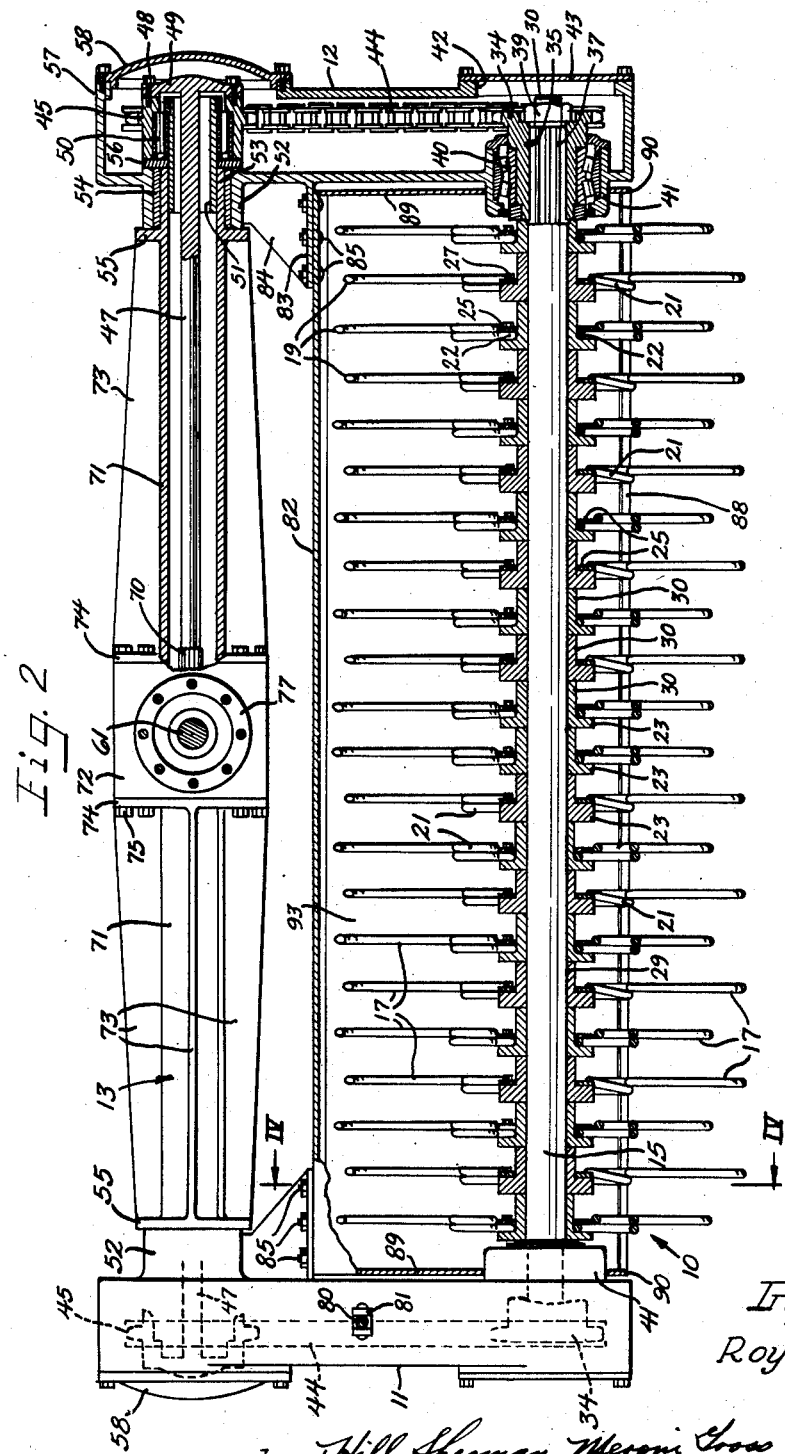

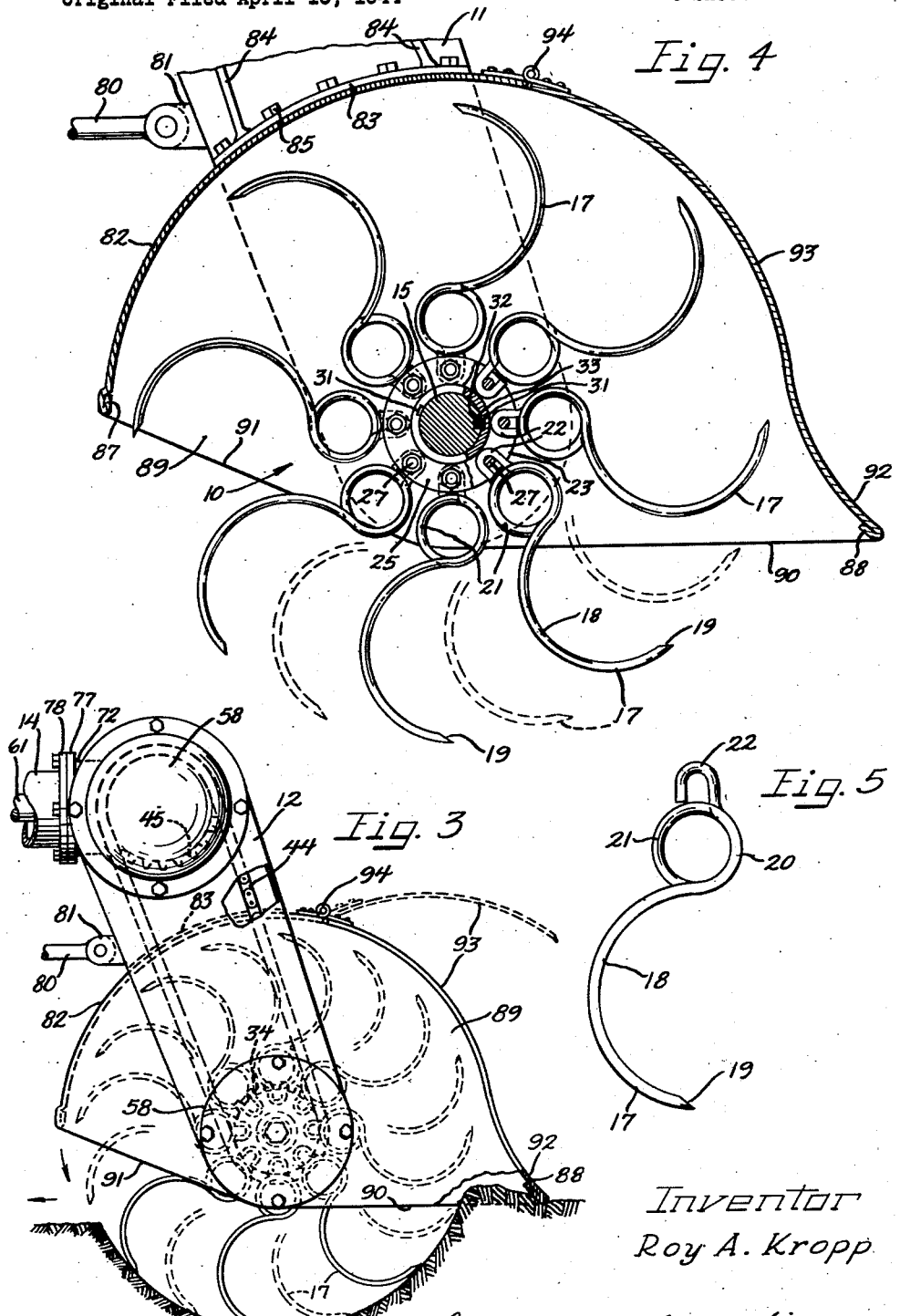

July 23, 1957 R. A. KROPP 2,800,065
SOIL CONDITIONER
Original Filed April 13, 1944 4 Sheets-Sheet 4
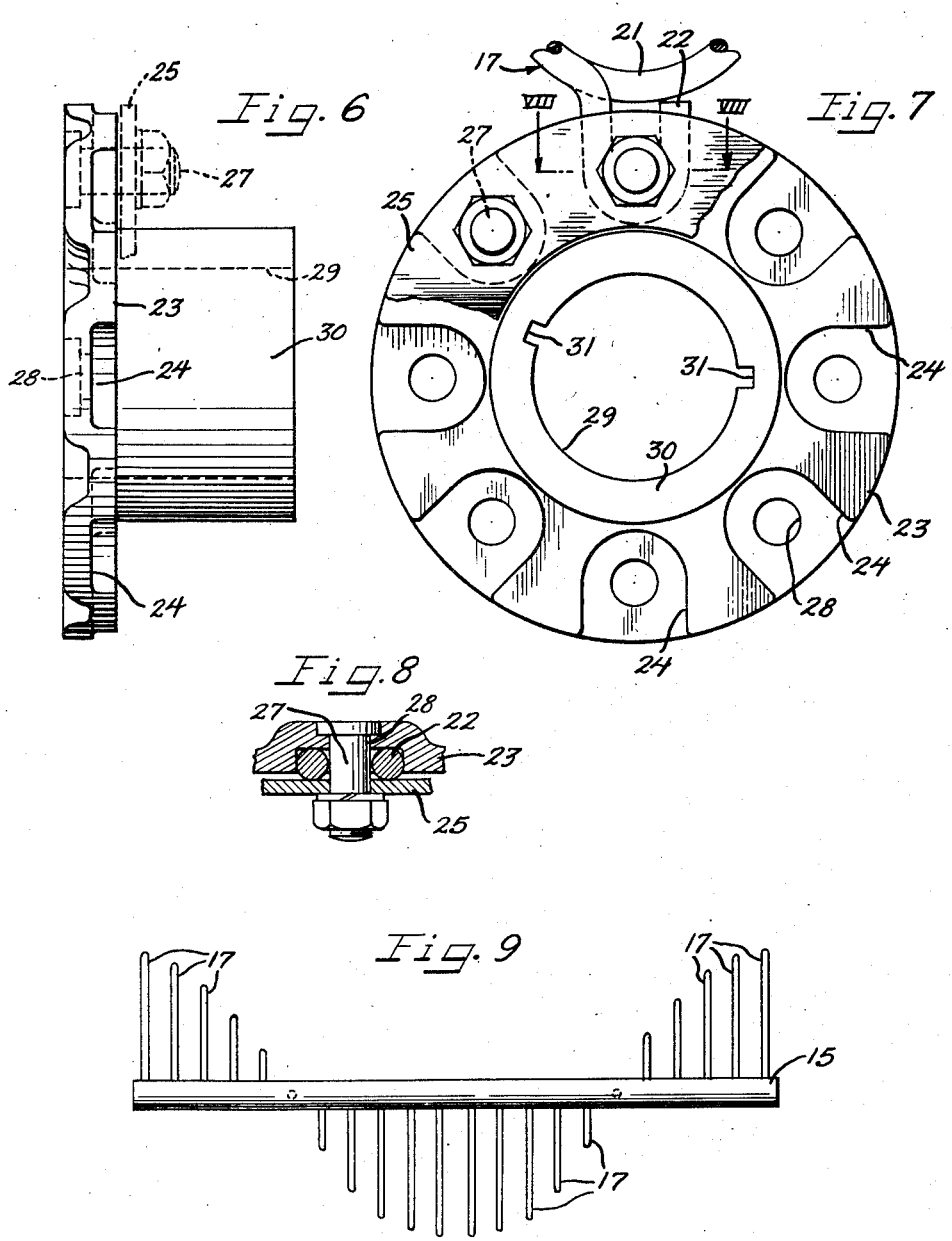
Inventor
Roy A. Kropp
by Hill, Sherman, Meroni, Gross & Simpson
Atty.

United States Patent Office 2,800,065
Patented July 23, 1957

2,800,065
SOIL CONDITIONER

Roy A. Kropp, River Forest, Ill., assignor to Kropp Forge Company, Cicero, Ill., a corporation of Illinois Division of application Serial No. 792,381, December 18, 1947, now Patent No. 2,638,830, dated May 19, 1953, which is a division of application Serial No. 530,797, April 13, 1944. Continuation of abandoned application Serial No. 557,153, October 4, 1944. This application January 19, 1953, Serial No. 333,261

1 Claim. (Cl. 97—40)

This invention relates to improvements in soil conditioners and more particularly concerns rotary tillers or cultivators of the kind arranged to travel over the ground while a rotary device operates to disintegrate the surface soil to a preferred depth and prepare the same for seeding or planting.

The present application is a division of my copending application, Serial No. 792,381, filed December 18, 1947, now Patent No. 2,638,830, which in turn is a division of my copending application, Serial No. 530,797, filed April 13, 1944, now issued as Patent No. 2,438,707, and is a continuation of my copending application Serial No. 557,153, filed October 4, 1944, now abandoned.

An important object of the present invention resides in the provision of improved rotary soil conditioning apparatus by which is attained an unusually thorough, uniform treatment of the soil area worked upon.

Another object of the invention is to provide an improved rotary soil conditioner in which the rotary soil disintegrating means is supported and operated in a novel manner.

A further object of the present invention is to provide a rotary soil conditioner which has an improved soil conditioning, tined rotor and hood arrangement.

According to the general features of the invention, there is provided in a soil conditioner including a power driven soil disintegrating rotor unit having means for pivotally connecting it to a vehicle for movement toward and away from the ground, said unit including a transverse shaft and generally radial tines carried thereby and a curved hood extending longitudinally of the shaft, as well as being curved over the tines and open at the bottom for the tines to project therefrom into engagement with the ground, the bottom edge of the hood being formed to bear against the ground when the unit is pivoted downwardly into operative position, each tine including a curved free extremity terminating in a point for digging and scraping dirt up into the hood and a torsion spring coil portion attached to the shaft, said free tine extremity being formed into a generally C-shape to progressively enter the ground arcuately and in the presence of the torsional tension of said spring portion, said hood having a yieldable rear door portion arranged to open outwardly against the pressure of accumulated dirt scraped up into the hood by the tines to prevent clogging of the dirt in the hood, said door portion having a lower edge for smoothing out the dirt as it passes over the ground.

Other objects, features and advantages of the present invention will be readily apparent from the following detailed description of a preferred embodiment thereof taken in conjunction with the accompanying drawings, in which:

Figure 2 is a front elevational view, partially in section, of the soil conditioner shown in Figure 1;

Figure 3 is a more or less schematic, partially sectional, side elevational view of the soil conditioner;

Figure 4 is an enlarged vertical sectional view taken substantially on the line IV—IV of Figure 2;

Figure 5 is a detail side elevational view of one of the soil disintegrating tines used in the rotor assembly of the soil conditioner;

Figure 6 is an enlarged edge elevational view of a tine mounting plate and hub structure as used in the rotor of the unit;

Figure 7 is an end or face elevational view of the plate and hub of Figure 6;

Figure 8 is a detail sectional view taken substantially on the line VIII—VIII of Figure 7; and Figure 9 is a schematic elevational view illustrative of the staggered tine arrangement of the disintegrator rotor.

As shown on the drawings:

Figure 1:
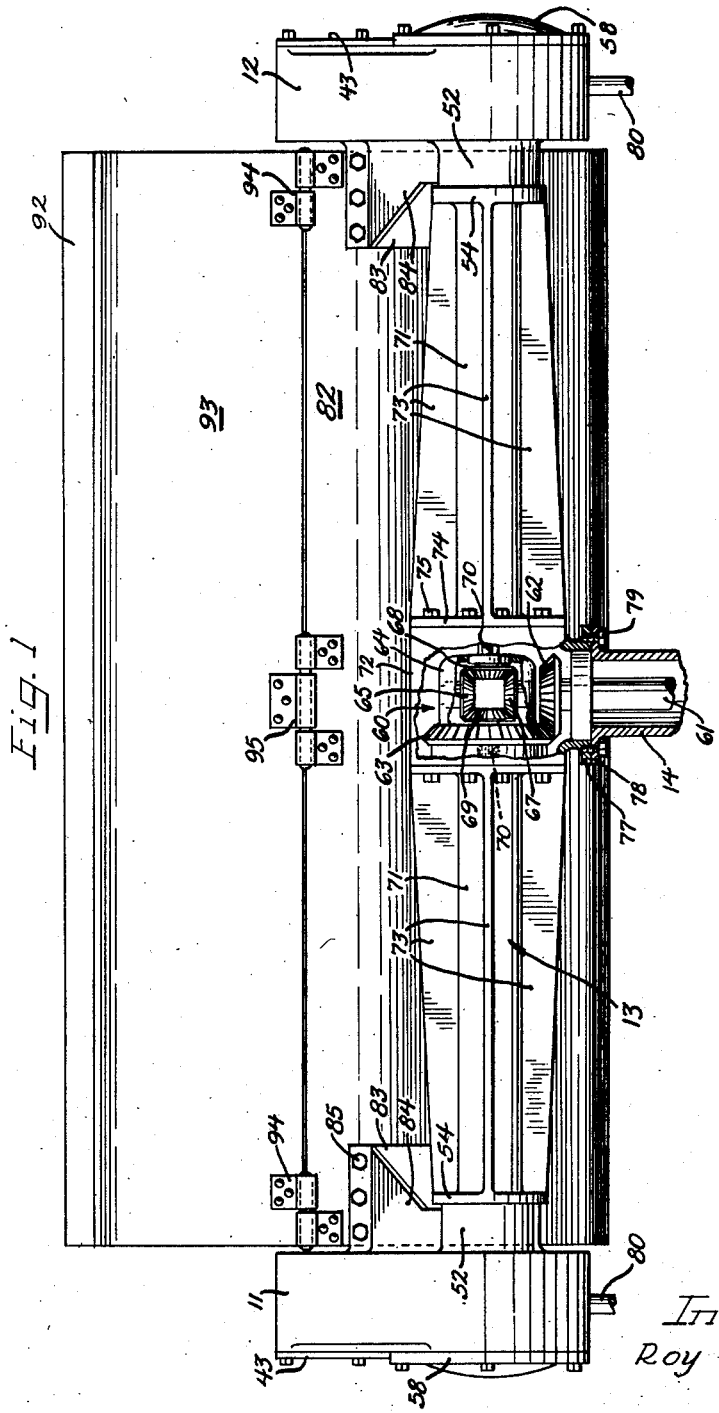
Figure 1 is a top plan view, partially in section, of a soil conditioner or tiller embodying the features of the present invention.

The present soil conditioner or tiller is of a width to treat a band of soil of substantial width as the conditioner travels over the soil and in the course of which it thoroughly digs and loosens the soil and disintegrates the same without packing the undisintegrated subsoil but actually advantageously roughening the surface thereof at the bottom of the cut made by the conditioner. As the soil is dug up it is effectively broken up and pulverized and thus provides a highly desirable, well aerated, efficiently draining, porous seed or plant bed. The apparatus is constructed to be motivated by appropriate propelling means such as a tractor or an individually associated power unit vehicle.

As the principal operative feature of the conditioner, it has a soil disintegrating rotor 10 which is supported rotatably by a pair of arms 11 and 12 pivotally carried at the opposite ends of a cross arm or head 13 supported by a supporting arm or draft bar 14. The latter may be coupled to or carried by a tractor or other powered vehicle for drawing or guiding the soil conditioner over a plot of ground to be treated, and for supporting the same above the ground when not in service.

The soil disintegrating rotor 10 comprises a shaft 15 (Figs. 2 and 4) carrying a series of generally radially extending soil digging and disintegrating teeth or tines 17. Each of the tines is preferably identical for purposes of standardization and is of a character to enter efficiently and individually into digging, gouging, disintegrating relation into the ground. To this end each of the tines 17 is of resilient, springy construction to yield resiliently to a limited extent in response to soil resistance while digging so as to acquire a torsional spring load which causes the same to leave the ground with a whipping action as an incident to release from the soil resistance. This resilient whipping action implements the soil breaking and disintegrating action by breaking up clods that may be present. Resilient metallic rod stock is a preferred material from which the tines 17 are made, and is formed to provide a generally hook-like C-shaped tine body 18 having a sharpened tip 19 of generally spade form, and a substantially ogee curved inner portion 20, the curvature of which is continued to provide a complete torsion spring loop or coil 21 terminating in a radially extending, U-shaped loop or hook formation 22. As best seen in Fig. 5, the hook loop 22 extends to the diametrically opposite side of the spring coil 21 from the curved body portion 18, and more particularly the cutting tip 19.

An annular series of the tines 17, such as eight, is secured as a unit to project radially from a mounting and attachment disc or plate 23 (Figs. 6, 7 and 8). The plate 23 has a series of recesses 24 in at least one face thereof of generally U-shape and opening through the edge of the plate. Each of the recesses 24 is complementary to the hook loop formation 22 to receive the same fairly closely with the companion torsion coil 21 extending freely beyond the edge of the plate. To hold the end hooks 22 in the respective recesses 24, a clamping disk ring 25 is secured thereagainst by respective attachment bolts 27. Each of the bolts 27 extends through a bolt hole 28 centered through the plate 23 at each of the recesses 24 and in such manner that the shank of the bolt extends through the engaged tine attachment hook or loop 22. In this manner the tines 17 are held in firm fixed, radially extending, uniformly and equally spaced, non-rocking relation to the mounting plate 23. As best seen in Fig. 4, the tines are all mounted with the soil disintegrating C-hook portions 18 thereof facing in the same direction. Thereby the C-hook portions are adapted to enter the ground successively and progressively in arcuate paths in the forward rotation of the supporting plate 23 and in the presence of the torsion spring tension of the loops 22.

For mounting the respective tine-carrying plates 23 upon the shaft 15, each of the plates is provided with an axial opening 29 and this opening is defined by a spacer hub 30 of a length such that when the desired series of tine units has been disposed coaxially on the shaft 15, a proper spaced relation will be maintained between the mounting plates 23 by the hubs engaging against the immediately adjacent plates in the series.

In order to hold the tine mounting plates 23 against rotation relative to the shaft 15, but to turn with the shaft, the plates 23 are appropriately keyed to the shaft. Herein, the keying arrangement is such that as an incident to mounting the tine-carrying plates 23 upon the shaft 15, the tines of the several tine units can be disposed in relative staggered relationship both lengthwise and circumferentially of the completed rotor assembly 10. To this end, each of the hubs 30 is formed with a pair of longitudinal keyway grooves or slots 31 which are disposed at opposite sides of the shaft opening 29, and with one of the key slots 31 offset appropriately such, for example, as 15° from the diameter on which the other key slot 31 is disposed. Thus, by placing the tine mounting plates 23 with the key slots 31 alternately in registration with a key slot 32 in the shaft and thus keying the same by means of one or more feather keys 33, the tines 17 of each tine unit will be staggered with respect to the tines of each adjacent unit throughout the entire assembly. The general effect of this will be, when viewed from the side of the rotor 10, that all of the tines are staggered both lengthwise and circumferentially of the rotor periphery. This is shown schematically in Figures 3 and 4 by the full and dash outline representations of the tines, and schematically in Figure 9 where a single row of staggered tines is followed from end to end of the rotor and which shows how the staggered arrangement affords a spiral disposition of the tines.

By preference, the staggered arrangement of the tines 17 is such that the rows of tines considered longitudinally of the rotor extend on converging spirals, that is, with the successive tines staggered spirally toward the longitudinal center of the shaft. As a result, the earth cutting and disintegrating tines 17 of adjacent tine units enter the soil successively and thus avoid building up of back pressure or resistance of undesirable magnitude in the soil disintegrating operation of the rotor 10, or the development of harmonic vibrations responsive to periodic resistances, since the normal low magnitude resistance which does develop is uniform and without any appreciable interim lags. Moreover, as the tines 17 emerge from the soil with more or less whipping action due to loading of the respective torsion spring coils 21 thereof by resistance to passage of the tines through the soil, the successive emergence of the tines following closely one upon the other assures freedom from harmonic vibrations or jerkiness.

Improved means are provided for driving the soil disintegrating rotor 10, such means being of a character to afford a positive drive at both ends of the shaft 15 but with never more than 50% of the torsional driving force at either end. Therefore, if the tines on one half of the shaft strike a non-yielding obstruction which increases the load on that particular half of the shaft, the power transmitted to the other half of the shaft will not have the full torsional force and load applied thereto to thus increase the torque upon the rotor to damaging magnitude.

To the attainment of these objectives, the shaft 15 has mounted on each end thereof a sprocket wheel 34 preferably formed with a hub 35 of substantial length and held for rotation with the shaft end portion by means such as splining 37, a reduced diameter threaded terminal 38 having a gear wheel retaining nut 39 thereon. The hubs 35 are designed to be supported rotatably by bearing assemblies 40 carried by respective bearing or journal sleeve flange formations 41 at the inner sides of the lower or free end portions of the pivoted arms 11 and 12, the respective splined ends of the shaft 15 with the gear wheels 34 thereon projecting through the bearing assemblies and to the interiors of the arms 12 which, for this purpose, are formed as hollow housings. Opposite the journal flange structures 41, that is in the outer walls of the housings provided by the respective pivoted arms 11 and 12 are provided respective access openings 42 which are covered by closure plates 43.

Each of the sprocket wheels 34 has trained thereover a sprocket chain 44 meshing with a sprocket wheel or gear 45 mounted upon the outer end of an individual drive shaft 47 projecting into the upper or pivoted end portion of the respective arms 11 or 12. As best seen in Fig. 2, the shaft 47 is concentric with and disposed in the hollow interior of the cross head or arm 13. The gear wheel 45 may be in ring form with the outer end portion of the shaft 47 extending concentrically therethrough and secured to the shaft as by means of screws 48 by which a concentric radial terminal end flange 49 on the shaft end is attached to the outer end of the sprocket wheel hub.

Rotary support for the ring gear wheel 45 is afforded by an anti-friction bearing assembly 50 which is carried by a supporting sleeve extension 51 of smaller diameter than and projecting rigidly from the end of the cross arm 13 into the hollow interior of the pivoted arm 11 or 12, as the case may be.

A pivotal connection between the respective arms 11 and 12 and the cross arm 13 is effected in each instance by a hub type flange 52 projecting inwardly from the upper end portion of the arm into telescopic relation to a smaller diameter terminal end portion 53 on the cross arm, an appropriate bearing 54 being interposed between the telescoped portions. An integral radial flange 55 on the cross arm limits inward movement of the hub flange 52 while a retaining ring or washer 56 mounted concentrically about the tubular sleeve extension 51 delimits axial outward movement of the telescoped portions and thus prevents separation of the respective arms from the cross head or arm structure 13.

Opposite the hub flange 52, each of the arms 11 and 12 is preferably formed with an access opening 57 which is closed by a removable closure plate 58.

A powerful, uniformly divided and in a sense individual drive for each of the shafts 47 is effected from a common source of motive power through the medium of a differential gear assembly 60 associated with a drive shaft 61 (Figs. 1 and 3) which leads to or from a prime mover or has driving connection with the engine of a tractor or other associated vehicle. Herein the shaft 61 is concentric within the supporting or draft arm 14 which for this purpose is tubular to provide a housing for the shaft. A bevel gear 62 carried by the shaft 61 meshes with a bevel gear 63 on a transmission cage 64 rotatable with the gear 63 and housing a set of quadrilaterally meshing bevel pinion gears including coaxial opposing idler pinions 65 and 67 with which mesh opposing coaxially disposed transmission bevel pinions 68 and 69 having the respective shafts 47 operatively connected therein through spline end portions 70 on the shafts. Thus, rotary power from the shaft 61 is transmitted through the transmission 60 to the shafts 47.

Should either half of the soil disintegrating rotor 10 encounter a relatively non-yielding or slow yielding obstruction which the tines 17 cannot bypass by laterally resilient yielding and which would tend to slow down the rotor or cause some structure thereof such as one or more of the tines 17 to yield or break, action of the gears in the transmission 60, and more particularly the meshing bevel pinions in the cage 64 permits that half of the rotor shaft 15 under resistance to slow down momentarily or at least to be relieved of driving force while the remaining half of the shaft 15 receives but half of the driving force imparted by the drive shaft 60. This slight lag or driving torque relief in one portion of the rotor will not be sufficient to develop any appreciable twist or damaging torque therein, but will be sufficient to relieve the driving force enough to permit movement of the rotor beyond the obstruction in the forward movement of the machine over the ground. The transmission drive 60 therefore affords a substantial safety factor and relieves the mechanism of damaging stresses or strains in service. It also assures uniform normal driving force transmission to the opposite ends of the rotor since it automatically takes up or compensates for any uneven lack or other maladjustment in the chain drives.

For economy in fabrication, and requisite strength and rigidity with minimum weight, the cross head or arm 13 is preferably formed of a plurality of sections comprising a pair of similar coaxial, oppositely extending tubular arm sections 71 and a central or transmission housing head section 72. Each of the tubular sections 71 is preferably formed of small diameter with reinforcing flanges or webs 73 longitudinally thereof between the respective lateral flanges 54 adjacent the outer extremities of the tubular sections and respective inner end lateral flanges 74. The flanges 74 are secured as by means of screws or bolts 75 to the sides of the central housing section 72.

Defining an opening for the shaft 61 at the forward side of the central or head housing section 72 is a lateral flange structure 77 which is arranged to receive thereagainst a lateral flange structure 78 on the supporting or draft arm 14, these flanges being secured together as by means of screws 79.

Since the arms 11 and 12 are supported pivotally by the cross arm 13, the rotor 10 is adapted to be swung up and down away from and toward the ground about the pivotal axis formed by the cross arm 13. Appropriate means for effecting such movement may comprise one or more links or rods 80 (Figs. 1, 2 and 3), herein shown as a pair, respectively connected to the arms 11 and 12 at the forward sides thereof through the medium of appropriate clevis brackets 81 on the arms. The opposite ends of the rods 80 may be connected to any appropriate means for operating the same (not shown, but comprising an operating lever or the like). Thus, when the machine is to be transported from place to place, or for any other reason the rotor 10 is to remain above the ground level, the arms 11 and 12 are adapted to be swung through operation of the rods 80 rearwardly and upwardly and there held by the rods, and when the rotor is to be dropped into operative relation to the ground, the rods 80 are adapted to be released or moved forwardly a predetermined distance. By retaining the rods 80 in any given longitudinal position relative to the arms 11 and 12, the approach of the rotor 11 to the ground, and more especially the depth to which the tines 17 may dig into the ground up to their extreme limit can be controlled.

To supplement the soil disintegrating action of the tines 17, and to confine the soil tossed up by the tines in operation against scattering, as well as to afford means for returning tossed disintegrated soil to the strip of ground being treated and uniformly distributing and smoothing the same, a downwardly opening hood 82 is mounted over the rotor 10. The hood is preferably formed from suitable gauge sheet metal of a length to extend over the entire length of the tined portion of the rotor 10 and of a transverse convex curvature forming an inner concave tine-opposing surface of arcuate contour concentric with and in slightly spaced relation to the periphery of the rotor 10 as defined by the sweep of the digging points 19 of the tines. The hood is supported by flange plates 83 extending inwardly from the respective inner sides of the pivoted arms 11 and 12 and formed of complementary arcuate shape to the hood, the flanges being preferably constructed integral with the respective arms and being reinforced by strut or gusset flanges 84 extending generally normal to the flanges 83 in the angle between the inner side wall of the pivoted arm and the hub 52. Means such as bolts 85 may be employed to secure the hood plate 82 to the supporting flanges 83.

As best seen in Figures 3 and 4, the forward edge of the hood 82 may be reinforced as by means of a turned under reinforcing bead or flange 87 and is located at an elevation, preferably in a plane above the axis of the shaft 15, to avoid obstructing forward movement of the soil conditioning unit and more particularly the disintegrating rotor 10 over the ground in operation. At its rear edge, the hood preferably extends to a position normally below the shaft 15 and at the elevation predetermined with respect to the lengths of the tines 17 to afford maximum digging penetration of the tines into the earth in operation. A turned under reinforcing flange or bead 88 is formed on the rear edge. Parallel end walls 89 on the hood are secured fixedly to the ends of the hood plate 82 and have respective lower edges 90 disposed coplanar on a line extending from the lower rear edge of the hood (Figs. 3 and 4) forwardly below the shaft 15 approximately equal to extension of the tine spring loops 21 and thence diagonally upwardly as at 91 to the forward reinforced edge 87 of the hood.

When the soil conditioner is in operative relation to the ground, the hood side plates 89 rest with the lower edges 90 thereof on the ground and acting as rotor unit supporting drags. The relationship of the edges 90 to the associated structure is such that they lie approximately horizontal when the rotor 10 is in full operating relation to the ground being worked upon. From Figures 1 and 3, it will also be observed that the lower ends of the arms 11 and 12 extend to the plane of the hood edges 90 and also assist in supporting the assembly on the ground, the edges 90 being disposed approximately tangential to the arm ends which are preferably of rounded contour.

As the rotor is driven forwardly as indicated by directional arrows in Figure 3, the ground dug up by the tines 17 is broken and disintegrated and clods are tossed up into and against the hood 82 where impact tends to break them up and if the impact is insufficient, the close spacing of the tips 19 of the tines to the hood causes the clods to be broken up mechanically and whipped about until finely sub-divided. The side edges 90 and the lower ends of the arms 11 and 12 limit the depth to which the tines 17 may penetrate the ground.

As the machine advances, the reinforced rear edge 88 of the hood drags over the ground as shown in Fig. 3 and smooths the same. To implement this smoothing action, the lower rear portion of the hood is preferably concavely formed on an ogee curvature relative to the remainder of the hood, substantially as indicated at 92 to provide a rearward flare.

Inasmuch as at times dirt, weeds, trash, or the like may accumulate within the rear part of the hood to an extent that might tend to clog the tines 17 and impair or disrupt operation, the rear part of the hood is preferably formed as a door 93. This is swingable rearwardly and upwardly, substantially as indicated in dash outline in Fig. 3, and is hinged to the upper and forward fixed portion of the hood as by means of end hinge assemblies 94 and a central hinge assembly 95 (Fig. 1). Ordinarily, the weight of the hinged door portion 93 of the hood will hold the same closed and in ground dragging position, however, when it is desired to gain access to the rotor, the door portion may be swung up, and when an undue accumulation of dirt or the like occurs at the rear of the rotor, the door may swing open under the pressure and thus relieve the clogging. Moreover, should there be an obstruction encountered which might tend to catch on the rear edge 88 of the hood, the door 93 will swing open to escape such obstructions.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

In a soil conditioning machine, a hollow cross head disposed generally horizontally and having drive shaft means therein, hollow arms at opposite ends of said cross head and depending therefrom, said depending arms having at the opposite ends thereof on the inner sides of the arms hub type flanges, the upper hub type flanges of the depending arms being journaled on tubular terminal end portions of said cross head, a rotor shaft having its opposite ends journaled in the lower hub type flanges of said hollow depending arms, drive means extending in at least one of said depending arms for driving said rotor shaft from said drive shaft means in said cross head, flange plates on the inner sides of said depending arms intermediate the upper and lower hub type flanges, and a downwardly opening hood supported from said flange plates between said arms and extending in spaced relation to said rotor shaft, said arms having broad surface rounded lower terminal portions flush with the lower edge of the hood.

References Cited in the file of this patent

UNITED STATES PATENTS

| | | |
|---|---|---|
| 662,366 | Payne | Nov. 20, 1900 |
| 823,240 | Waterman | June 12, 1906 |
| 1,289,700 | Dixon | Dec. 31, 1918 |
| 1,504,495 | Patitz | Aug. 12, 1924 |
| 1,511,476 | Ingersoll | Oct. 14, 1924 |
| 1,600,215 | Clarkson | Sept. 21, 1926 |
| 1,614,356 | Foot | Jan. 11, 1927 |
| 1,843,119 | Bussmann | Feb. 2, 1932 |
| 2,012,434 | Pedersen | Aug. 27, 1935 |
| 2,214,702 | Seaman | Sept. 10, 1940 |
| 2,221,221 | Seaman | Nov. 12, 1940 |
| 2,232,523 | Gray | Feb. 18, 1941 |
| 2,299,334 | Matter | Oct. 20, 1942 |
| 2,368,331 | Seaman | Jan. 30, 1945 |
| 2,370,777 | Clark | Mar. 6, 1945 |

FOREIGN PATENTS

| | | |
|---|---|---|
| 101,866 | Australia | Aug. 18, 1937 |
| 360,815 | Italy | July 6, 1938 |